(12) United States Patent
Saladin et al.

(10) Patent No.: US 8,707,068 B2
(45) Date of Patent: Apr. 22, 2014

(54) USB HOST WAKE UP VIA A USB DEVICE WHEN IN SHUT DOWN MODE

(75) Inventors: Peter Saladin, Palatine, IL (US); James Snider, Kildeer, IL (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 340 days.

(21) Appl. No.: 13/103,676

(22) Filed: May 9, 2011

(65) Prior Publication Data

US 2012/0290859 A1 Nov. 15, 2012

(51) Int. Cl.
*G06F 1/00* (2006.01)
*G06F 1/32* (2006.01)

(52) U.S. Cl.
USPC .................. 713/310; 713/320; 713/324

(58) Field of Classification Search
USPC ........................................... 713/310
See application file for complete search history.

(56) References Cited

U.S. PATENT DOCUMENTS

| | | | |
|---|---|---|---|
| 6,010,257 A * | 1/2000 | Petteruti et al. | 400/88 |
| 6,941,114 B1 | 9/2005 | Kuo et al. | |
| 6,996,215 B2 * | 2/2006 | MacConnell | 379/106.03 |
| 7,596,366 B2 * | 9/2009 | Van Bosch et al. | 455/343.2 |
| 7,725,194 B2 * | 5/2010 | Klostermann et al. | 607/60 |
| 7,856,566 B2 * | 12/2010 | Orr | 713/320 |
| 7,889,201 B2 * | 2/2011 | Yato | 345/501 |
| 8,103,895 B2 * | 1/2012 | Hatano | 713/324 |
| 8,230,243 B2 * | 7/2012 | Fujiwara | 713/310 |
| 2009/0323573 A1 * | 12/2009 | He et al. | 370/311 |
| 2010/0115296 A1 | 5/2010 | Inoue et al. | |

FOREIGN PATENT DOCUMENTS

JP 2005275612 A 10/2005

OTHER PUBLICATIONS

International Search Report and Written Opinion dated Jun. 28, 2012, from corresponding International Patent Application No. PCT/US2012/031934.

* cited by examiner

*Primary Examiner* — Suresh Suryawanshi

(57) ABSTRACT

A system and method for communicating between a controller and a device is provided: The controller communicates with the device over a communication link. The controller shutting off a power supply that is connected to the communication link, for example, due to inactivity parameters. The device generating a wake up signal and transmitting the wake up signal from the device to the controller while the power supply is shut off.

21 Claims, 3 Drawing Sheets

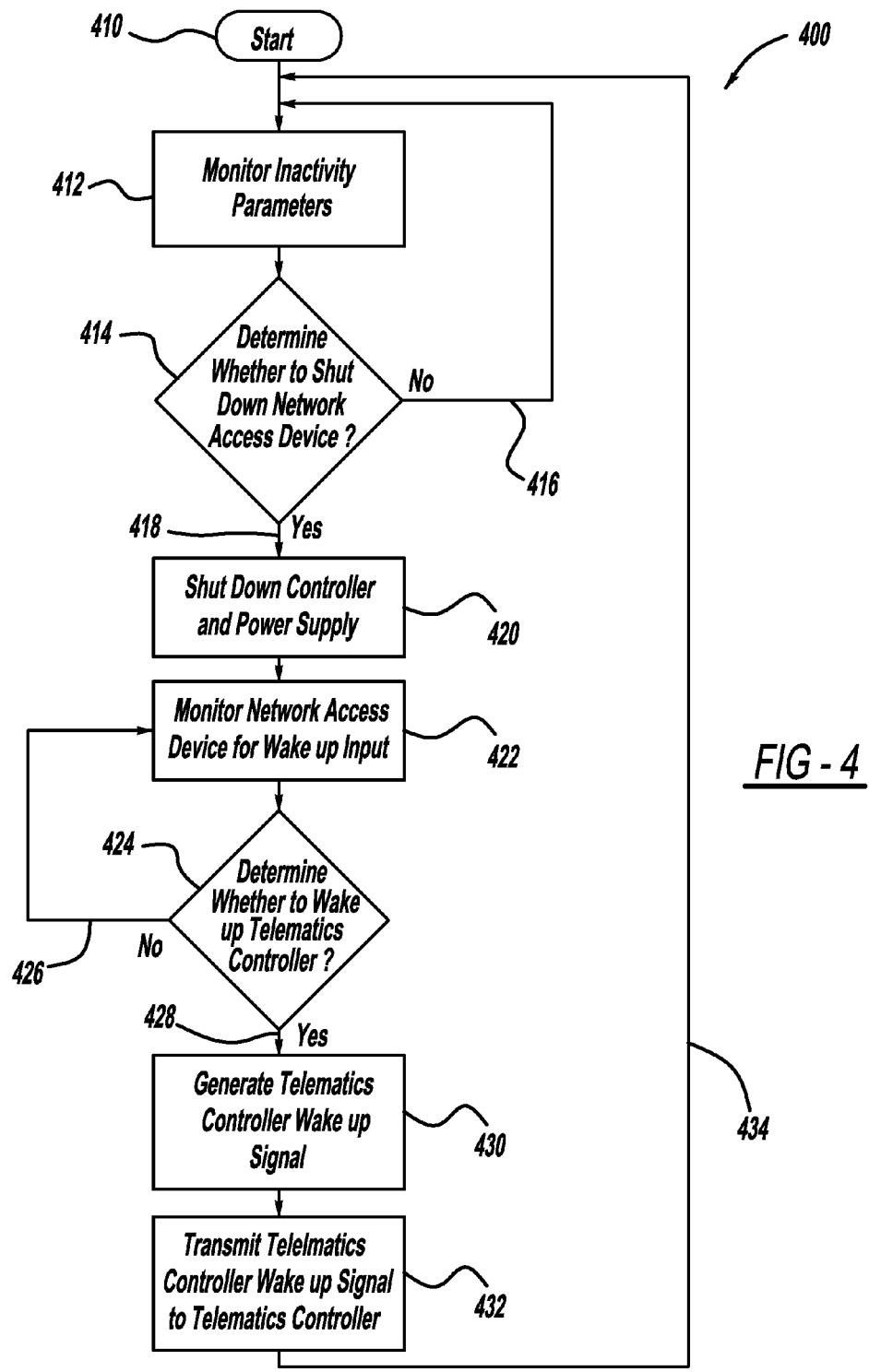

US 8,707,068 B2

USB HOST WAKE UP VIA A USB DEVICE WHEN IN SHUT DOWN MODE

BACKGROUND

1. Field of the Invention

The present invention generally relates to a system and method for communication between a controller and a device.

2. Description of Related Art

Recently, many devices have switched to universal serial bus (USB) communication links. Even in the stringent automotive environment, USB communication links have become accepted. USB communication happens between a USB host and a USB device. Generally, the host will deliver a voltage to power up the USB device over the USB communication link. The host can then read the pull up/down resistors on the data lines to determine the device class and communicate accordingly. When there is no bus activity, the USB host can go into suspend mode. The device can wake the host by sending data. (e.g. a USB mouse or keyboard) This is possible because the 5V VUSB from the host is still present in suspend mode so the device can wake the host.

In view of the above, it is apparent that there exists a need for an improved system and method for communication between a controller and a device.

SUMMARY

In satisfying the above need, as well as overcoming the enumerated drawbacks and other limitations of the related art, the present invention provides a system and method for communicating between a controller and a device. The controller communicates with the device over a communication link. The controller may shut off a power supply that is connected to the communication link, for example, due to inactivity parameters. The device generating a wake up signal and transmitting the wake up signal from the device to the controller while the power supply is shut off.

As discussed above, when there is no bus activity, the USB host can go into suspend mode. Typically, the 5V VUSB supply from the host is still present in suspend mode so the device can wake the host. The specification for current drain in suspend mode on VUSB is 500 uA, however, often devices draw 1 mA to 10 mA and actually violate this requirement. The system described herein saves current by completely shutting down the host power supply without losing the ability to wake the host controller over the USB lines from the device.

One application where this is useful is in telematics. With telematics systems, it may be desirable to have a network access device (NAD) in the vehicle separate from the box that contains the telematics control unit (TCU). The only connection from the NAD to the host vehicle processor in the TCU may be a standard USB cable. When the vehicle is shut down, the NAD will be in service on the cellular network waiting for a short message service (SMS) text. Since the vehicle is shut down, portions of the TCU may be enabled (e.g. the USB host in suspend mode, VUSB, power supplies etc.) drawing current off the car battery. If an SMS is received, the NAD can wake the vehicle host processor over the USB interface and normal operation can resume (e.g. the TCU can then send a message over the controller-area network (CAN) bus to unlock the vehicle doors etc.) To limit the current drain off the vehicle battery in this mode, it may be desirable to shut down all non-essential functions of the TCU like the USB supply power and wait for a wake up signal from the NAD. The issue remains as how to wake the TCU over USB if the VUSB is shut down.

In one solution, an additional pin may be connected from the NAD to the TCU called TCU_Wakeup. This is an I/O that can be toggled by the NAD to wake the TCU to resume normal operation. However, an extra signal conductor is not available on the four wire USB interface. One such solution is to multiplex the TCU wake up signal with one of the USB signal lines.

The standard USB interface remains with the additional functionality to wake the TCU without having to keep the VUSB high in suspend mode draining current off the car battery or without having to add an additional wire to the standard USB interface.

Further objects, features and advantages of this invention will become readily apparent to persons skilled in the art after a review of the following description, with reference to the drawings and claims that are appended to and form a part of this specification.

BRIEF DESCRIPTION OF THE DRAWINGS

FIG. 4 is a flowchart illustrating a method of communicating between a network access device and a telematics controller.

DETAILED DESCRIPTION

Figure 1:
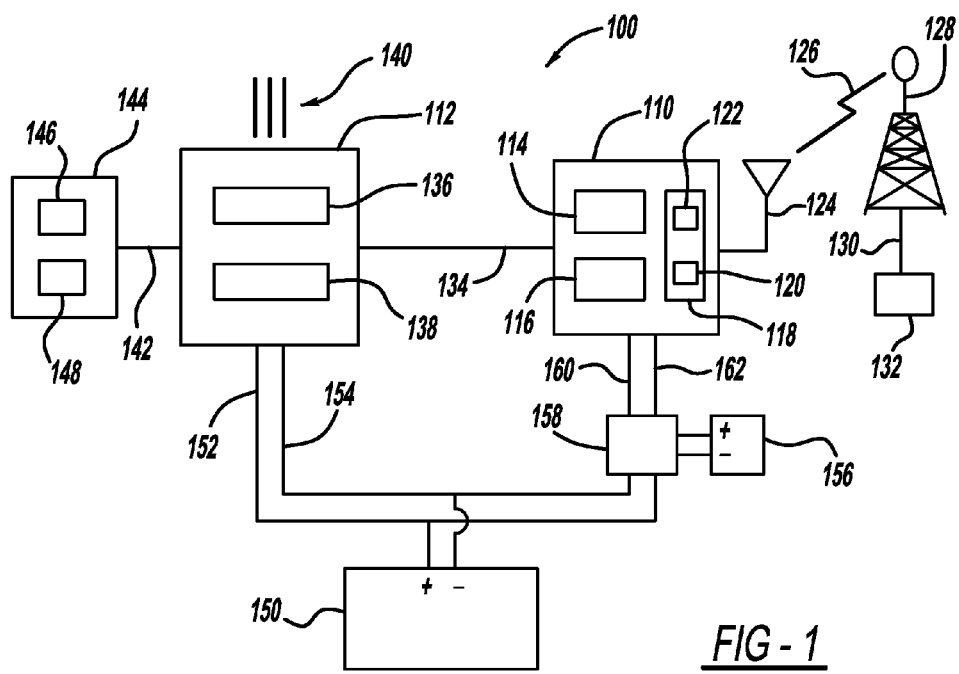
FIG. 1 is a schematic view of a system including a telematics controller and a network access device.

Now referring to FIG. 1, a system 100 is provided. The system includes a network access device 110 and a telematics controller 112. The network access device 110 may include a processor 114 and a storage device 116. The processor 114 may be a programmable microprocessor or alternatively may be an application specific integrated circuit (ASIC), or other known processor. The storage device 116 may be a memory, for example, random access memory, static memory, or other data storage device. The network access device 110 may also include a transceiver 118 which includes a transmitter 122 and a receiver 120. Alternatively, the network access device 110 may include an independent transmitter and receiver. The transceiver 118 may be in communication with an antenna 124. The transceiver 118 may communicate with a radio tower 128 as denoted by line 126. The communication 126 between the network access device 110 and the radio tower 128 may comprise one of a plurality of communication modes.

The transceiver 118 in the network access device 110 may be used for transmitting uplink communications and receiving downlink communication to and from the network 130 and service center 132 over the wireless communication link 126. The wireless communication link 126 may use a wireless protocol such as a standard cellular network protocol such as Advanced Mobile Phone Service (AMPS), Global System for Mobile Communications (GSM), Time Division Multiple Access (TDMA), Code Division Multiple Access (CDMA), and the like. To transmit data in the cellular environment, different types of standard bearer services exist including, but not limited to, general packet radio service (GPRS), short message service (SMS), circuit switched data service (CSD), and high-speed circuit switched data service (HSCSD). Further, standard transmission control protocol/internet protocol (TCP/IP) may also be used as well as satellite communications. In a further example, the transceiver 118 may be enabled using other wireless technologies such as Bluetooth technology. Bluetooth technology allows for the replacement of a wired connection by enabling devices to communicate with each other through a universal short-range radio link.

The radio tower 128 may be in communication with a service provider 132 including for example, a network server through a network 130. Network 130 may be an analog network such as a POTS or a digital network for example, Ethernet over TCPIP protocol. In other examples, the network 130 could be one of several standard cellular communication networks, a satellite-based network, a public switched telecommunication network (PSTN), the Internet, an integrated services digital network (ISDN), and/or other communication networks. The service provider may include a service center to provide telematics applications and services to the vehicle. For instance, the service center may contain operators, content servers and content databases. The content servers for telematics applications and services may include traffic servers, map servers, user profile servers, location information servers, and the like. The content databases for telematics applications and services may include location information, user profiles, traffic content, map content, point-of-interest content, usage history, and the like.

The network access device 110 may be in communication with the telematics controller 112 through a communication interface 134. In some implementations the network access device 110 may be in the same package as the telematics controller 112. However, other implementations the network access device 110 may be provided in a separate package from the package of the telematics controller 112 and, therefore, may be located in a different area of the vehicle. Various information may be communicated between the telematics controller 112 and the network access device 110.

The telematics controller 112 may include a processor 136 and storage device 138. The processor 136 may be a microprocessor, an application specific integrated circuit, a programmable gate array, or other processor. Further, the storage device 138 may be a memory device for example, random access memory, read only memory, static memory, or may even be a hard drive or optical drive, or other means of data storage. The telematics control 112 may be in communication with a plurality of other vehicle sensors and devices through a wire harness or over the vehicle bus as denoted by lines 140. In addition, the telematics controller 112 may be in communication with a user interface 144 as denoted by line 142. The user interface 144 may include a display 146 and controls 148 for providing user input such as vehicle parameters into the telematics controller 112. Also, the user interface 144 may include elements such as a keyboard or keypad, one or more control buttons, indicator lights, one or more speakers, a microphone, and any other user interface type elements for telematics applications and services. Optionally, the telematics controller 112 may also be connected to a positioning unit. The positioning unit could be a system that determines the geographic location of the vehicle such as a global positioning system (GPS), a dead-reckoning system, and the like.

Further, the telematics controller 112 may be in communication with other vehicle systems, such as the engine control system, the vehicle lock controls, the vehicle safety systems (e.g. seatbelt retractors, airbags, etc.), vehicle entertainment system, or a suspension control system to implement the described functions of the telematics controller 112 or network access device 110 based on parameters of such systems.

The telematics controller 112 may be powered by the vehicle battery 150 as denoted by lines 152 and 154. Alternatively, a voltage converter may be provided to convert from the vehicle battery voltage to a different voltage that may be appropriate for running the telematics controller 112. The voltage converter may be included in the package for the telematics controller 112 or alternatively may be in a separate package between the vehicle battery 150 and the telematics controller 112. The vehicle battery 150 may also provide power to the network access device 110.

A circuit 158 may be included between the vehicle battery 150 and the network access device 110. The circuit 158 may include a voltage converter to change the voltage provider to the network access device 110 in lines 160 and 162. In addition, the circuit 158 may be connected to a network access device battery 156. The network access device battery 156 may be charged while the vehicle is running and may for example, be switched to provide power to the network access device 110 when power from the vehicle power system (e.g., the battery or alternator) is not available. Further, the circuit 158 may control the monitoring and periodic powering of the network access device if the vehicle is turned off for a long period of time. Further, the circuit 158 may control the charging of the network access device battery 156 at appropriate times according to the environmental variables or the expected use cycle of the vehicle.

Figure 2:
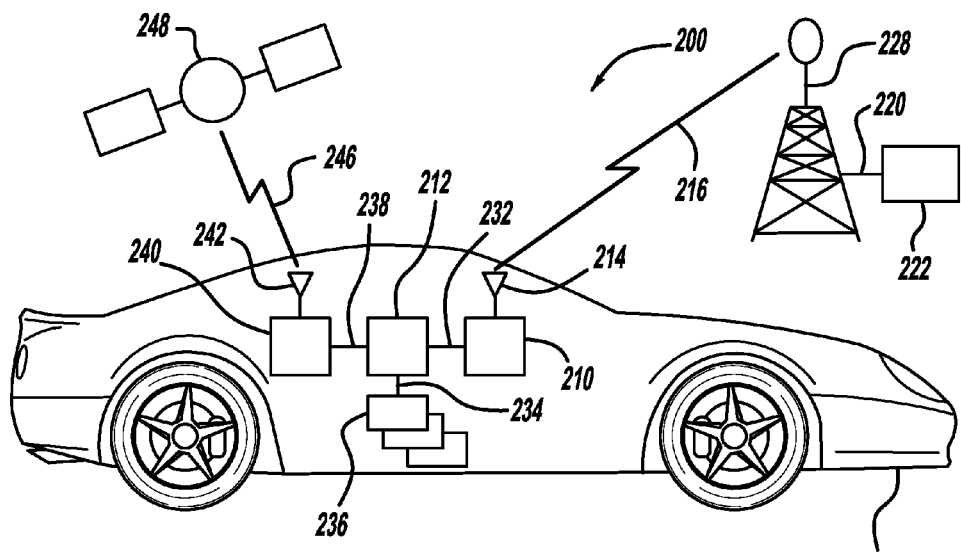
FIG. 2 is a schematic view of a system with a telematics controller and network access device implemented within a motor vehicle.

Now referring to FIG. 2, one possible implementation of the system 100 is provided within a vehicle 230. The network access device 210 may be provided in a separate package from the telematics controller 212. The network access device 210 may be connected to an antenna 214. The antenna 214 may be representative of a plurality of antennas or a matrix of antennas depending upon the particular communication mode selected. Communication of the network access device 210 is facilitated with a remote station 228 as denoted by line 216. As described previously, the remote station 228 may be in communication with a service provider 222 including a network server through a network 220. The telematics controller 212 may be in communication with a global positioning device 240 over the vehicle bus or a custom connection as denoted by line 238. The global positioning device 240, such as a satellite global positioning system (GPS), may be in communication with an antenna 242. The antenna 242 may be one of a plurality of antennas or a matrix of antennas. Further, the antenna or plurality of antennas represented by reference number 242 may be the same antennas as denoted by reference number 214. The GPS unit may be in communication with a satellite 48 as denoted by line 246. As such, the GPS unit 240 may retrieve positional data for the vehicle or in other implementations 240 may also represent a general satellite receiver and, therefore, may receive other general broadcast information or communication from the satellite 248. The telematics controller 212 may also be in communication with various other vehicle devices and systems through the vehicle bus, wire harnesses, or other wireless connections as denoted by line 234. The various other devices 236 may include but are not limited to the engine control system, the vehicle locks, the vehicle safety systems (e.g. seatbelt retractors, airbags, etc.), vehicle entertainment system, or a suspension control system.

Figure 3:
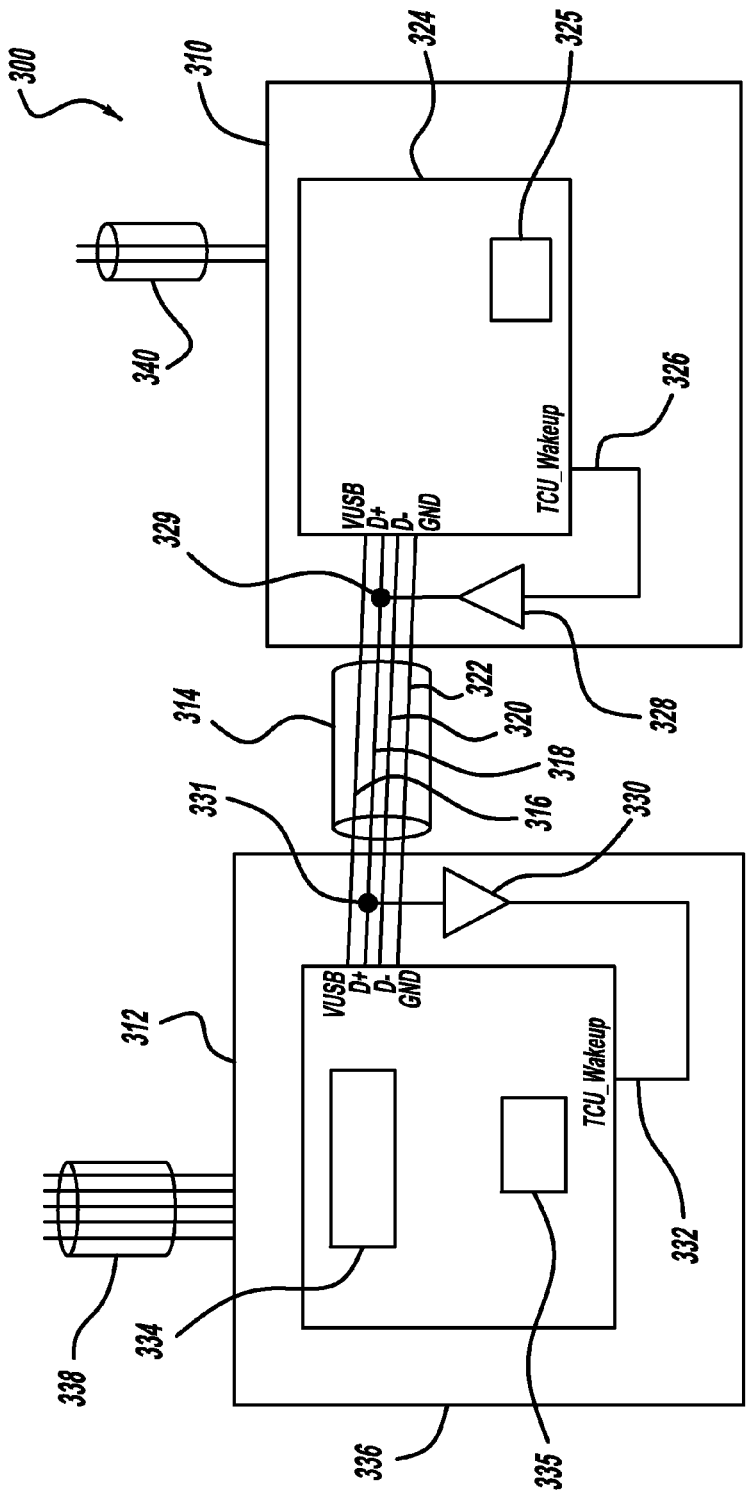
FIG. 3 is a schematic view of a system with a telematics control unit and a network access device that are housed separately.

FIG. 3 is a schematic view of a system 300 including a telematics control unit and a network access device that are housed separately in independent enclosures. The network access device 310 may correspond to network access devices 110, 210 and include a processor, storage device, and a transceiver as described above with respect to the previous figures. Similarly, the telematics controller 312 may correspond to telematics controller 112, 212, as well as, include a processor and storage device as described above with regard to the previous figures. The network access device 310 is in communication with the telematics controller 312 through a multiple conductor cable. For example, in one implementation the network access device 310 is in communication with the telematics controller 312 through a standard USB cable, and more specifically, may be in communication through a standard four pin USB cable. As such, the cable 314 may have a first conductor 316 connected to a VUSB connection on the telematics processor 366 and the VUSB connection on the NAD processor 324. A second conductor 318 of the cable 314 may be connected to a positive data connection (D+) on both the telematics processor 336 and the NAD processor 324. A third conductor 320 of the cable 314 may be connected to a negative data connection (D−) on both the telematics processor 336 and the NAD processor 324. In addition, a fourth conductor 322 may be in communication with a ground connection on both the telematics processor 336 and the NAD processor 324.

A cable 340 may connect the network access device 310 to the vehicle battery to provide minimal power for a wake up procedure. Similarly, a cable harness 338 may be connected to the telematics control unit 312 to provide a connection to the vehicle battery and other devices for example, over the vehicle bus. Vehicle battery power may be provided a power supply 334 for example, a power regulator or a charge pump which can provide power over the standard USB connection on the VUSB conductor. However, when the vehicle is shut down it may be beneficial to disable the power supply 334 to limit drain on the vehicle battery. For example, even with no load on the power supply 334, a draw of 100 microamps may be used to generate the VUSB line voltage.

Typically a USB device connected over a standard USB cable will require power over the VUSB connection to wake up the telematics controller when an input is received. However, the network access device may be configured to wake up the telematics control unit without the VUSB power provided over the standard USB cable. In one example, the NAD processor 324 may include a transceiver 325 for wirelessly communicating with a transceiver 335 on the telematics processor 336. While this wake up communication is functional, it may not be optimized for a reduction in power consumption. As such, a wake up signal from the NAD processor 324 may be transmitted over one of the conductors on the cable 314 that is allocated for another signal (e.g., a data line or power line) and provided to the telematics processor 336. Accordingly, a wake up output 326 on the NAD processor 324 may be connected to a node 329 electrically connected to one of the conductors of the cable 314. In addition, a node 331 in the telematics controller 312 may be connected to a wake up input 332 on the telematics processor 336. Accordingly, the wake up output 326 is essentially connected electrically to the wake-up input 332 of the telematics processor 336 over one of the conductors of cable 314, such as a standard USB four pin cable. In such an implementation, while any of the conductors could be used, it would be preferable to use the VUSB conductor, the positive data conductor, or the negative data conductor. Further, it may be more preferable to use the positive data conductor 318 than the other conductors in the four pin USB implementation.

A buffer 328 may also be provided between the wake up output 326 and node 329 to isolate the wake up signal from the data line. Similarly, a buffer 330 may be connected between node 331 and the wake up input 332 to isolate the wake up input 332 from the data line and vice versa. Further, the buffers 330 and 328 may be disabled thereby isolating the conductor from the wake up input 332 and wake up output 326 during normal operation when a wake up signal is not anticipated and normal data transmission occurs for example, within a certain time period of the data lines being used or the VUSB line being active. As such, in one implementation the wake up output 326 is connected to an input of the buffer 328 and an output of the buffer 328 is connected to node 329. Node 329 is connected through cable 314 to node 331. Further, node 331 is then connected to the input of buffer 330, while the output of buffer 330 is connected to the wake up input 332 of the telematics processor 336. Communicating a wake up signal according to this method can greatly reduce the power required during a shut down mode for example, such a method may require less than 500 microamps.

Now referring to FIG. 4, a method of communicating between the network access device and the telematics controller is provided. A method 400 starts in block 410. In block 412, various inactivity parameters are monitored. For example, the telematics control unit may monitor whether the vehicle has been shut down for certain time period. The telematics controller may then determine whether to shut down the telematics controller or the network access device, as denoted in block 414. If the determination is made to not shut down the telematics controller, the method follows line 416 to block 412, where inactivity parameters are monitored and the loop continues. If in block 414 the telematics controller determines to shut down, then the method follows line 418 to block 420. In block 420, the telematics controller and power supply are shut down. They may be shut down simultaneously or shut down separately according to various parameters. For example, the controller may be shut down and the power supply that provides power to the USB cable may be shut down after a certain time interval. In block 442, the network access device monitors for wake up inputs. Wake up inputs may be one of various inputs including for example, but not limited to phone call, text (e.g., SMS), or other message being received.

In block 424, the network access device determines whether to wake up the telematics controller. If the network access device decides not to wake up the telematics controller, the method follows line 426 to block 422, where the loop continues. If the network access device determines to wake up the telematics controller, the method follows line 428 to block 430. In block 430, the network access device generates a telematics controller wake up signal. In block 432, the telematics controller wake up signal is transmitted to the telematics controller. As discussed previously, this may be through a wireless connection or may more advantageously be through a piggy back connection over one of the conductors of the cable between the network access device and the telematics controller. The method then follows line 434 to block 412 where the loop continues.

In other embodiments, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Further, the methods described herein may be embodied in a computer-readable medium. The term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

As a person skilled in the art will readily appreciate, the above description is meant as an illustration of the principles of this invention. This description is not intended to limit the scope or application of this invention in that the invention is susceptible to modification, variation and change, without departing from spirit of this invention, as defined in the following claims.

We claim:

1. A system for communicating a wake up signal comprising:
   a telematics controller having a communication link and a power supply for the telematics controller, the power supply being connected with the communication link, the telematics controller being configured to shut off the power supply for the telematics controller according to inactivity parameters; and
   a network access device configured to communicate with the telematics controller through the communication link, the network device being configured to communicate a wake up signal to the telematics controller while the power supply for the telematics controller is shut off.

2. The system according to claim 1, wherein communication link is a USB communication link comprising a cable, wherein the network access device is configured to have a wake up signal output node and the telematics controller has a wake up signal input node, the wake up signal output node being coupled to the wake up signal input node by a conductor in the cable.

3. The system according to claim 1, wherein USB communication link is a four conductor cable and wherein the USB communication link is configured to multiplex the wake up signal on one conductor of the four conductor cable.

4. The system according to claim 1, wherein the telematics controller is configured to shut off the power supply responsive to inactive of the telematics controller.

5. The system according to claim 2, wherein a conductor of the cable is connected to a USB output of the network access device, a wake up output of the network access device also being connected to the conductor to provide the wake up signal to the telematics controller.

6. The system according to claim 5, wherein a buffer is connected between the conductor and the wake up output node.

7. The system according to claim 1, wherein a conductor of the cable is connected to a USB input of the telematics controller, a wake up input node of the telematics controller also being connected to the conductor to provide the wake up signal to the telematics controller.

8. The system according to claim 7, wherein a buffer is connected between the conductor and the wake up input node.

9. The system according to claim 1, wherein the conductor is connected to a data line of the USB output.

10. The system according to claim 1, wherein the conductor is connected to a USB voltage line of the USB output.

11. The system according to claim 1, wherein the device provides the controller with the wake up signal over a wireless connection.

12. A network access device in communication with a telematics controller, the telematics controller having a power supply, the network access device being connected to the telematics controller by a USB communication link, the network access device comprising:
    a processor and a USB output, the USB output being connected to the USB communication link, the processor being configured to communicate a wake up signal to the telematics controller while the power supply is shut off.

13. The system according to claim 12, wherein the telematics controller is configured to shut off the power supply responsive to inactivity of the telematics controller.

14. The system according to claim 12, wherein USB communication link is a four conductor cable.

15. The system according to claim 14, wherein a conductor of the cable is connected to a USB output of the device, a wake up output of the device also being connected to the conductor to provide the wake up signal to the controller.

16. The system according to claim 15, wherein a buffer is connected between the conductor and the wake up output.

17. A telematics controller in communication with a network access device, the telematics controller being connected with a USB communication link, the telematics controller comprising:
    a processor;
    a power supply, the processor shutting off the power supply based on inactivity parameters;
    a USB port, the USB port being connected to the USB communication link, the telematics controller being configured to receive a wake up signal from the network access device while the power supply is shut off; and
    a wake up signal input port, which is operatively coupled to a conductor comprising the USB communication link and configured to receive the wake up signal from the network access device over said conductor.

18. The system according to claim 17, wherein USB communication link is a four conductor cable and wherein the wake up signal is multiplexed onto said conductor.

19. The system according to claim 17, wherein a buffer is connected between the conductor and the wake up input.

20. A method for communicating between telematics controller and a network access device, the method comprising:
    providing a communication link between the telematics controller and the network access device;
    shutting off a power supply of the telematics controller that is connected to the communication link;
    generating a wake up signal by the network access device; and
    transmitting the wake up signal from the network access device to the telematics controller while the power supply is shut off.

21. In a computer readable storage medium having stored therein instructions executable by a programmed processor for communicating between a telematics controller and a network access device, the storage medium comprising instructions for:

providing a communication link between the telematics controller and the network access device;
shutting off a power supply of the telematics controller that is connected to the communication link;
generating a wake up signal by the network access device; and
transmitting the wake up signal from the device to the controller while the power supply is shut off.

* * * * *